United States Patent
Enshu

(10) Patent No.: US 9,221,610 B2
(45) Date of Patent: Dec. 29, 2015

(54) CONVEYOR BELT AND CONVEYOR BELT APPARATUS

(71) Applicant: BRIDGESTONE CORPORATION, Tokyo (JP)

(72) Inventor: Hirozumi Enshu, Yokosuka (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 14/418,008

(22) PCT Filed: Jul. 2, 2013

(86) PCT No.: PCT/JP2013/068145
§ 371 (c)(1),
(2) Date: Jan. 28, 2015

(87) PCT Pub. No.: WO2014/021045
PCT Pub. Date: Feb. 6, 2014

(65) Prior Publication Data
US 2015/0203299 A1    Jul. 23, 2015

(30) Foreign Application Priority Data
Jul. 31, 2012    (JP) .................................. 2012-169919

(51) Int. Cl.
*B65G 43/02* (2006.01)
*B65G 15/34* (2006.01)
*B65G 15/32* (2006.01)

(52) U.S. Cl.
CPC ................ *B65G 15/34* (2013.01); *B65G 15/32* (2013.01); *B65G 43/02* (2013.01)

(58) Field of Classification Search
CPC ...................................................... B65G 43/02
See application file for complete search history.

(56) References Cited

U.S. PATENT DOCUMENTS 3,636,436 A * 1/1972 Kurauchi et al. .............. 324/226
3,731,113 A * 5/1973 Lowe et al. .............. 198/810.02

(Continued)

FOREIGN PATENT DOCUMENTS

JP    60-165540 A    8/1985
JP    1-164216 U    11/1989

(Continued)

OTHER PUBLICATIONS

International Search Report of PCT/JP2013/068145, dated Oct. 8, 2013. [PCT/ISA/210].

*Primary Examiner* — Gene Crawford
*Assistant Examiner* — Thomas Randazzo
(74) *Attorney, Agent, or Firm* — Sughrue Mion, PLLC

(57) ABSTRACT

A conveyor belt (13) includes a main body rubber (14) extending in a belt longitudinal direction, tension members (15) embedded in the main body rubber throughout a circumference of the main body rubber (14) in the belt longitudinal direction, and loop coils (16) embedded in the main body rubber (14) and having an annular shape in plan view taken in a belt thickness direction (T). The loop coils (16) are embedded at one side of the main body rubber (14) in the belt thickness direction (T), and the tension members (15) are embedded at the other side of the main body rubber (14) in the belt thickness direction (T) relative to the loop coils (16). The loop coils (16) are disposed above a cloth-shaped reinforcement (17) embedded in the main body rubber (14), and a Young's modulus of the cloth-shaped reinforcement (17) in a belt width direction (H) is higher than that of the main body rubber (14) in the belt width direction (H), and is higher than that of the cloth-shaped reinforcement (17) in the belt longitudinal direction. According to the conveyor belt (13), vertical cracks can be detected with high accuracy.

5 Claims, 2 Drawing Sheets

(56) References Cited

U.S. PATENT DOCUMENTS

| | | | | |
|---|---|---|---|---|
| 3,731,786 | A | * | 5/1973 | Nagata et al. ............ 198/810.02 |
| 4,621,727 | A | * | 11/1986 | Strader .................... 198/810.02 |
| 4,690,191 | A | * | 9/1987 | Kawasaki ..................... 152/527 |
| 4,854,446 | A | * | 8/1989 | Strader .................... 198/810.02 |
| 4,865,103 | A | * | 9/1989 | Kobayashi et al. ........... 152/536 |
| 8,330,452 | B2 | * | 12/2012 | Furukawa ................ 324/207.11 |
| 2012/0012444 | A1 | * | 1/2012 | Kuesel ......................... 198/847 |

FOREIGN PATENT DOCUMENTS

| | | |
|---|---|---|
| JP | 2-261711 A | 10/1990 |
| JP | 6-48549 A | 2/1994 |
| JP | 11-208862 A | 8/1999 |
| JP | 2005-162430 A | 6/2005 |
| JP | 2008-87950 A | 4/2008 |
| JP | 2008-285326 A | 11/2008 |

* cited by examiner

CONVEYOR BELT AND CONVEYOR BELT APPARATUS

CROSS REFERENCE TO RELATED APPLICATIONS

This application is a National Stage of International Application No. PCT/JP2013/068145filed Jul. 2, 2013, claiming priority based on Japanese Patent Application No. 2012-169919, filed Jul. 31, 2012, the contents of all of which are incorporated herein by reference in their entirety.

TECHNICAL FIELD

The present invention relates to a conveyor belt and a conveyor belt apparatus.

BACKGROUND ART

As a conventional conveyor belt apparatus capable of detecting vertical cracks of a conveyor belt, for example, a constitution as indicated in Patent Literature 1 below is known. Such a conveyor belt apparatus is equipped with a conveyor belt in which a loop coil is embedded in a main body rubber extending in a belt longitudinal direction, a magnetic generator for generating a magnetic field that produces an induced current in a loop coil, and a detector for detecting the induced current produced in the loop coil. The loop coil has an annular shape in plan view taken in a belt thickness direction. In the conveyor belt apparatus, if vertical cracks are formed at the conveyor belt and the loop coil is disconnected, the induced current occurring at the loop coil when the magnetic field is generated from the magnetic generator is changed, and thus the vertical cracks are detected by the detector.

In general, a part of the conveyor belt which runs in the belt longitudinal direction undergoes bending deformation in a belt width direction. In a state in which such a part is subjected to the bending deformation, for instance, in a trough shape or in a pipe shape, conveyance items are conveyed in the belt longitudinal direction.

DOCUMENT OF RELATED ART

Patent Document

[Patent Document 1]
Japanese Unexamined Patent Application, First Publication No. 2005-162430

SUMMARY OF INVENTION

Technical Problem

Incidentally, in the prior art conveyor belt apparatus, for the purpose of improving detection accuracy of the induced current, embedding the loop coil at one side of the main body rubber in the belt width direction and detecting the induced current from the one side with respect to the main body rubber may be considered.

In this case, however, the loop coil moves to the one side relative to a neutral axis against the bending in the belt width direction at the conveyor belt, and when the conveyor belt repeats the bending deformation and its restoration in the belt width direction, an amount of deformation of the loop coil is increased. As a result, a weak portion at the loop coil, for instance a joint portion of a conducting wire constituting the loop coil, is broken by stress applied to the loop coil, and the loop coil is disconnected. As such, despite the fact that no vertical cracks are formed at the conveyor belt, vertical cracks may be falsely detected.

The present invention has been made in consideration of the aforementioned situation, and it is therefore an object of the present invention to provide a conveyor belt and a conveyor belt apparatus capable of detecting vertical cracks with high accuracy.

Solution to Problem

To solve the problem, the present invention suggests the following means.

A conveyor belt according to the present invention includes: a main body rubber configured to extend in a belt longitudinal direction; tension members embedded in the main body rubber throughout a circumference of the main body rubber in the belt longitudinal direction; and loop coils embedded in the main body rubber and configured to have an annular shape in plan view taken in a belt thickness direction. The loop coils are embedded at one side of the main body rubber in the belt thickness direction, and the tension members are embedded at the other side of the main body rubber in the belt thickness direction relative to the loop coils. The loop coils are disposed above a cloth-shaped reinforcement embedded in the main body rubber, and a Young's modulus of the cloth-shaped reinforcement in a belt width direction is higher than that of the main body rubber in the belt width direction, and is higher than that of the cloth-shaped reinforcement in the belt longitudinal direction.

Further, a conveyor belt apparatus according to the present invention includes: the conveyor belt; a magnetic generator configured to generate a magnetic field that produces an induced current at each loop coil; and a detector configured to detect the induced current produced at each loop coil.

According to these inventions, the Young's modulus of the cloth-shaped reinforcement in the belt width direction is higher than that of the main body rubber in the belt width direction. As such, in comparison with the case in which the cloth-shaped reinforcement is not embedded in the main body rubber, a neutral axis against bending in the belt width direction at the conveyor belt is moved to the one side, and the neutral axis and the loop coil can be caused to come near each other in the belt thickness direction. Accordingly, when the conveyor belt repeats the bending deformation and its restoration in the belt width direction, an amount of deformation of the loop coil is suppressed, and a weak portion of the loop coil can be inhibited from being broken by stress applied to the loop coil. Thereby, vertical cracks of the conveyor belt can be inhibited from being falsely detected, and can be more accurately detected.

Further, the Young's modulus of the cloth-shaped reinforcement in the belt width direction is higher than that of the cloth-shaped reinforcement in the belt longitudinal direction. As such, as the cloth-shaped reinforcement is embedded in the main body rubber, bending rigidity of the conveyor belt in the belt longitudinal direction can be inhibited from being increased excessively.

For example, when the cloth-shaped reinforcement is constituted of warp threads extending in the belt longitudinal direction and weft threads extending in the belt width direction, the material or diameter of the warp and weft threads is made different, or the number of warp and weft threads per unit length is made different. Thereby, it is possible to adjust a relationship between the Young's modulus of the cloth-shaped reinforcement in the belt width direction and the Young's modulus of the cloth-shaped reinforcement in the belt longitudinal direction.

Further, in the conveyor belt according to the present invention, the cloth-shaped reinforcement may be disposed between the loop coil and the tension member in the main body rubber.

In this case, since the cloth-shaped reinforcement is disposed between the loop coil and the tension member in the main body rubber, the cloth-shaped reinforcement is formed of an insulator. Thereby, for example, even when a constitution having electroconductivity like a steel cord is employed as the tension member, the loop coil and the tension member can be inhibited from being short-circuited, and the vertical cracks can be more accurately detected.

Further, in the conveyor belt according to the present invention, the loop coil may be sandwiched in the belt thickness direction between the cloth-shaped reinforcement and a cloth-shaped body embedded in the main body rubber.

In this case, the loop coil is sandwiched between the cloth-shaped reinforcement and the cloth-shaped body in the belt thickness direction. As such, when the conveyor belt is manufactured, even if the main body rubber is vulcanized with the loop coil disposed in the main body rubber, the cloth-shaped reinforcement and the cloth-shaped body can be interposed between the loop coil and the main body rubber. Accordingly, even when the main body rubber has fluidity due to the application of heat and pressure during the vulcanization, the loop coil is inhibited from being deformed and displaced in association with a flow of the main body rubber, and the conveyor belt can be formed with high accuracy. Thereby, the vertical cracks can be detected with higher accuracy.

Further, in the conveyor belt according to the present invention, the cloth-shaped body may have a lower Young's modulus in the belt width direction than the cloth-shaped reinforcement.

In this case, the Young's modulus of the cloth-shaped body in the belt width direction is lower than that of the cloth-shaped reinforcement in the belt width direction. As such, as the cloth-shaped body is embedded in the main body rubber, the bending rigidity of the conveyor belt in the belt width direction can be inhibited from being increased excessively Effects of the Invention According to the present invention, vertical cracks can be detected with high accuracy.

DESCRIPTION OF EMBODIMENTS

Hereinafter, a conveyor belt apparatus according to an embodiment of the present invention will be described with reference to the drawings.

Figure 1:
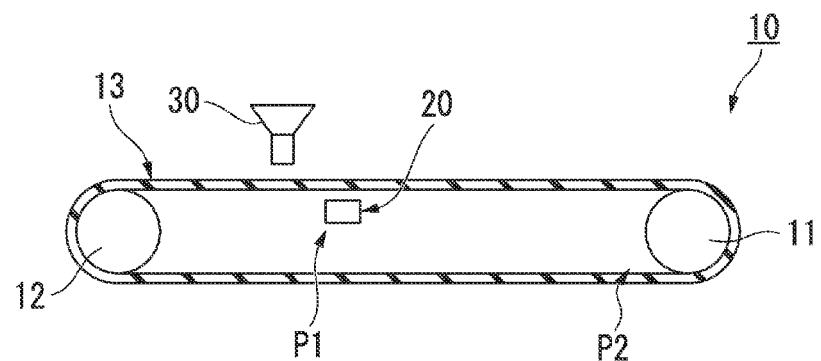
FIG. 1 is a side view of a conveyor belt apparatus according to a first embodiment of the present invention.
Figure 2:
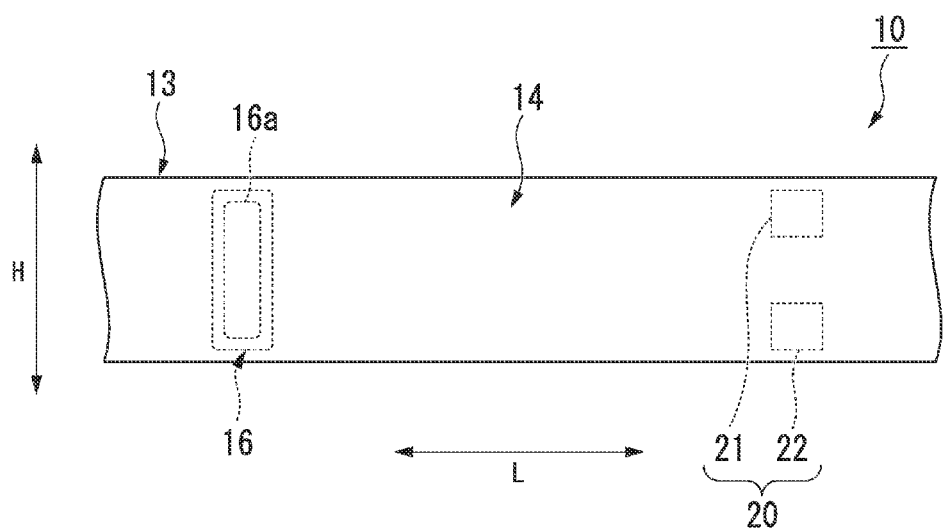
FIG. 2 is a plan view of the conveyor belt apparatus illustrated in FIG. 1.
Figure 3:
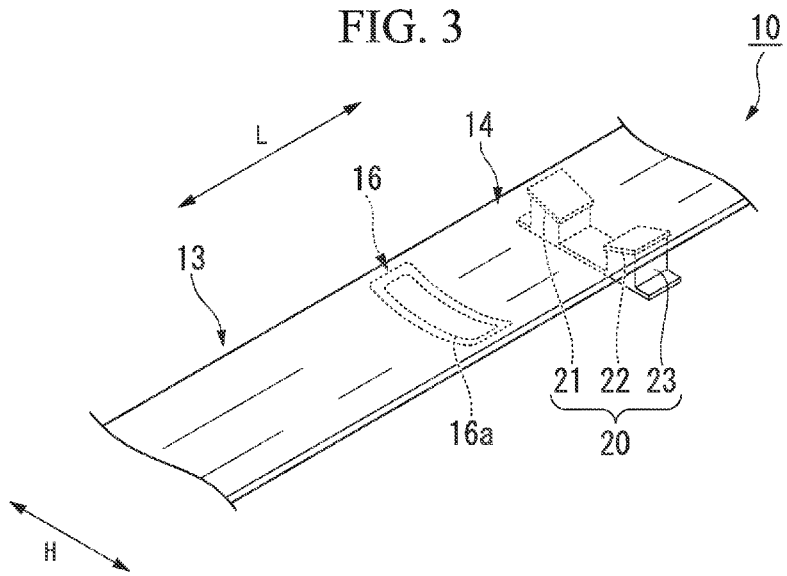
FIG. 3 is a perspective view of the conveyor belt apparatus illustrated in FIG. 1.

As illustrated in FIGS. 1 to 3, a conveyor belt apparatus 10 includes a pair of pulleys 11 and 12 that are disposed apart from each other in a horizontal direction and are rotatable about rotational axes thereof, and an endless belt-shaped conveyor belt 13 that is wound between the pulleys 11 and 12.

As the pair of pulleys 11 and 12, a driving pulley 11 and a driven pulley 12 are equipped. The rotational axes of both of these pulleys 11 and 12 are parallel to each other and extend in a belt width direction H.

Figure 4:
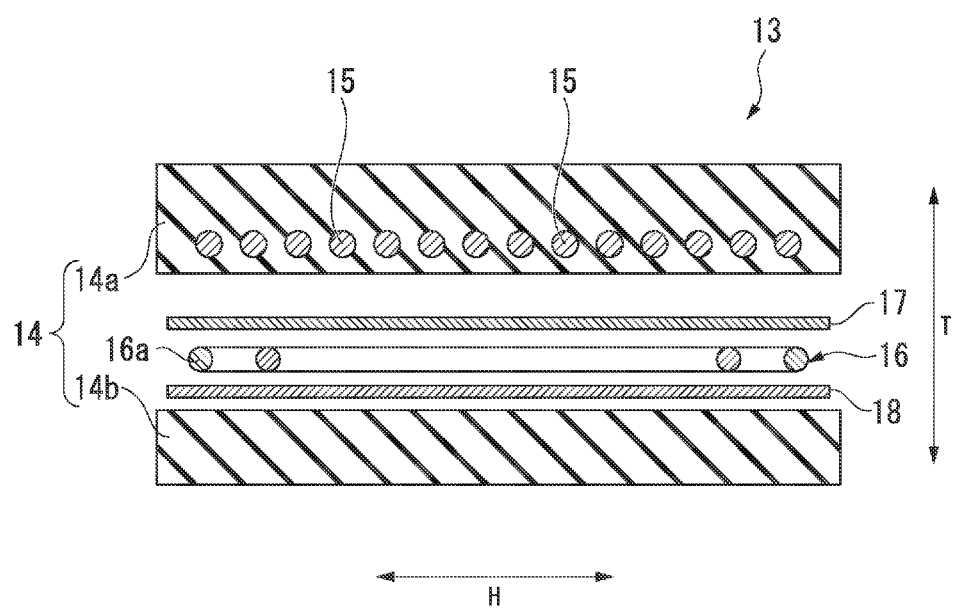
FIG. 4 is a cross-sectional view illustrating a state in which a conveyor belt constituting the conveyor belt apparatus illustrated in FIG. 1 is disassembled.

As illustrated in FIGS. 2 to 4, the conveyor belt 13 includes a main body rubber 14 that extends in a belt longitudinal direction L, a tension member 15 that is embedded in the main body rubber 14 over the entire circumference of the main body rubber 14 in the belt longitudinal direction L, and a loop coil 16 that is embedded in the main body rubber 14 and is formed in an annular shape in plan view taken in a belt thickness direction T.

The main body rubber 14 is formed of, for instance, a vulcanizable rubber material. As the rubber material, for instance, natural rubber (NR), isoprene rubber (IR), butadiene rubber (BR), or styrene-butadiene copolymer rubber (SBR) may be used independently or in combination.

A plurality of tension members 15 are formed as steel cords or organic fiber cords extending in the belt longitudinal direction L, and are arranged in the belt width direction H. The organic fiber cords include, for example, nylon, polyester, or aramid. The tension members 15 are arranged in the middle of the main body rubber 14 in the belt thickness direction T so as to be across nearly an entire area in the belt width direction H.

A plurality of loop coils 16 are arranged in the main body rubber 14 at intervals in the belt longitudinal direction L. As illustrated in FIG. 4, the loop coils 16 are embedded at an inner side (one side) of the main body rubber 14 in the belt thickness direction T, and the tension members 15 are embedded at an outer side (other side) of the main body rubber 14 in the belt thickness direction T relative to the loop coils 16.

The loop coils 16 extend in the belt width direction H, and have a rectangular ring shape that is long in the belt width direction H in the aforementioned plan view. Opposite ends of each loop coil 16 in the belt width direction H are disposed at opposite lateral ends of the main body rubber 14 in the belt width direction H. In the loop coil 16, ends of a conducting wire 16a are connected to each other, and a joint portion (not shown) of the conducting wire 16a is formed at a portion of the loop coil 16. The joint portion is a weak portion that is more easily broken than other portions of the loop coil 16. In the illustrated example, the loop coil 16 is doubly formed, and is coaxially disposed on a coil axis (not shown) extending in the belt thickness direction T.

The loop coil 16 is disposed above a cloth-shaped reinforcement 17 embedded in the main body rubber 14. A plurality of cloth-shaped reinforcements 17 are arranged at intervals in the belt longitudinal direction L in response to the loop coils 16. The cloth-shaped reinforcements 17 extend in the belt width direction H, and have a rectangular shape that is long in the belt width direction H in the aforementioned plan view and is larger than the loop coils 16. The cloth-shaped reinforcements 17 are disposed between the loop coils 16 and the tension members 15 in the main body rubber 14, and cover the loop coils 16 from the outer side.

The loop coils 16 are each sandwiched between the cloth-shaped reinforcement 17 and a cloth-shaped body 18 embedded in the main body rubber 14 in the belt thickness direction T. A plurality of cloth-shaped bodies 18 are arranged at intervals in the belt longitudinal direction L in response to the loop coils 16 and the cloth-shaped reinforcements 17. The cloth-shaped bodies 18 cover the loop coils 16 from the inner side. The cloth-shaped bodies 18 are formed approximately in the same shape and size as the cloth-shaped reinforcement 17 in the aforementioned plan view, and are superimposed on the cloth-shaped reinforcements 17.

The cloth-shaped reinforcements 17 and the cloth-shaped bodies 18 may be formed of, for instance, canvas.

Here, as illustrated in FIG. 4, the main body rubber 14 is configured in such a manner that multiple rubber layers 14a and 14b are stacked in the belt thickness direction T. The rubber layers 14a and 14b are provided as an outside rubber layer 14a constituting an outer surface of the conveyor belt 13 and an inside rubber layer 14b constituting an inner surface of the conveyor belt 13. These rubber layers 14a and 14b are formed of the same rubber material. The tension members 15 are embedded at the outer side rubber layer 14a. A thickness of the outside rubber layer 14a which is a size taken in the belt thickness direction T is greater than that of the inside rubber layer 14b. Thus, the loop coils 16, the cloth-shaped reinforcements 17, and the cloth-shaped bodies 18 are sandwiched between the rubber layers 14a and 14b in the belt thickness direction T. The main body rubber 14 is formed by vulcanizing the unvulcanized rubber layers 14a and 14b that sandwich the loop coils 16, the cloth-shaped reinforcements 17, and the cloth-shaped bodies 18.

Thus, in the present embodiment, the Young's modulus of the cloth-shaped reinforcement 17 in the belt width direction H is higher than that of the main body rubber 14 in the belt width direction H, and is higher than that of the cloth-shaped reinforcement 17 in the belt longitudinal direction L. The Young's modulus of the cloth-shaped reinforcement 17 in the belt width direction H is, for instance, about 100 times the Young's modulus of the main body rubber 14 in the belt width direction H.

Here, the cloth-shaped reinforcement 17 is made up of warp threads (not shown) extending in the belt longitudinal direction L and weft threads (not shown) extending in the belt width direction H, and the warp threads are woven by the weft threads. Thus, by varying the material or diameter of the warp and weft threads, or varying the number of warp and weft threads per unit length, the Young's modulus of the cloth-shaped reinforcement 17 in the belt width direction H and the Young's modulus of the cloth-shaped reinforcement 17 in the belt longitudinal direction L are adjusted. In the present embodiment, the warp threads are formed of nylon, and the weft threads are formed of polyester. The warp threads have a smaller diameter than the weft threads, and the number of warp threads per unit length in the belt width direction H is smaller than the number of weft threads in the belt longitudinal direction L. Thereby, the Young's modulus of the cloth-shaped reinforcement 17 in the belt width direction H is higher than that of the cloth-shaped reinforcement 17 in the belt longitudinal direction L.

The Young's modulus of the cloth-shaped body 18 in the belt width direction H is lower than that of the cloth-shaped reinforcement 17 in the belt width direction H. The Young's modulus of the cloth-shaped body 18 in the belt width direction H and the Young's modulus of the cloth-shaped body 18 in the belt longitudinal direction L are equal to each other.

Here, as illustrated in FIGS. 1 to 3, the conveyor belt 13 whose outer surface is directed in a vertical upward direction and which belongs to a carrier side travels in a state in which it is supported in a trough shape by a belt-supporting means (not shown). A plurality of belt-supporting means are disposed between the driving pulley 11 and the driven pulley 12 in the belt longitudinal direction L. The belt-supporting means includes, for instance, a constitution equipped with a center roller that supports the middle of the main body rubber 14 in the belt width direction H and a pair of side rollers that separately support lateral ends of the main body rubber 14 in the belt width direction H. The center roller is arranged to be rotatable about a rotational axis extending in the belt width direction. The pair of side rollers are disposed on both outer sides of the center roller in the belt width direction H, and are arranged to be rotatable about rotational axes inclined with respect to the rotational axis of the center roller.

Further, the conveyor belt 13 whose outer surface is directed in a vertical downward direction and which belongs to a return side travels in a state in which it is flatly spread in the belt width direction H.

In this way, the conveyor belt 13 travels at the carrier side in a state in which it is subjected to bending deformation in the belt width direction H and is supported in a trough shape, and travels at the return side in a state in which it is flatly spread in the belt width direction H. In connection with the traveling, the conveyor belt 13 repeats the bending deformation and its restoration in the belt width direction H.

Thus, as illustrated in FIG. 1, the carrier-side conveyor belt 13 subjected to the bending deformation in the belt width direction H conveys conveyance items (not shown) loaded on the conveyor belt 13 from the side of the driven pulley (one pulley) 12 toward the side of the driving pulley (other pulley) 11. A hopper 30 for dropping the conveyance items onto the outer surface of the conveyor belt 13 is provided above the carrier-side conveyor belt 13. The carrier-side conveyor belt 13 conveys the conveyance items dropped from the hopper 30 to an unloading portion (not shown) provided at the side of the driving pulley 11.

Here, as illustrated in FIGS. 1 to 3, the conveyor belt apparatus 10 further includes a magnetic generator 21 that generates a magnetic field for producing an induced current at the loop coil 16, and a detector 22 that detects the induced current produced at the loop coil 16. The magnetic generator 21 and the detector 22 are disposed at the inner side of the conveyor belt 13. Positions of the magnetic generator 21 and the detector 22 in the belt longitudinal direction L are the same. The magnetic generator 21 and the detector 22 are disposed apart from each other in the belt width direction H. The magnetic generator 21 is opposite to the inner side of the conveyor belt 13 at one of the lateral ends of the conveyor belt 13 in the belt width direction H, and the detector 22 is opposite to the inner side of the conveyor belt 13 at the other of the lateral ends.

The magnetic generator 21 and the detector 22 are integrally fixed by a frame 23. The magnetic generator 21, the detector 22, and the frame 23 constitute a vertical crack-detecting means 20 for detecting vertical cracks of the conveyor belt 13. The vertical crack-detecting means 20 is disposed at a conveyance start position P1 that is adjacent to the hopper 30 from the side of the driving pulley 11 on a belt path through which the carrier-side conveyor belt 13 passes. The vertical crack-detecting means 20 is disposed adjacent to the hopper 30 in the belt longitudinal direction L. A plurality of vertical crack-detecting means 20 may be disposed on the belt path through which the conveyor belt 13 passes. The vertical crack-detecting means 20 may be disposed, for instance, at a return start position P2 that is adjacent to the driving pulley 11 from the side of the driven pulley 12 on the belt path through which the return-side conveyor belt 13 passes.

The magnetic generator 21 is equipped with an oscillation circuit (not shown) that generates a high-frequency magnetic field (e.g., about 15 kHz) that is a magnetic field whose frequency is high, and oscillates the high-frequency magnetic field toward the one lateral end at the conveyor belt 13. When the loop coil 16 approaches a range of the high-frequency magnetic field, the induced current is produced at the loop coil 16 by an electromagnetic induction phenomenon.

The detector 22 is equipped with a receiver coil (not shown) that forces an induced electromotive force to be generated by the induced current produced at the loop coil 16. The detector 22 detects the induced current, which is produced at the loop coil, from the inner side of the conveyor belt 13 by means of the receiver coil. Then, a determining unit (not shown) for determining whether or not the vertical cracks of the conveyor belt 13 are present based on the induced electromotive force produced at the receiver coil is connected to the detector 22.

In the conveyor belt apparatus 10, when a portion of the conveyor belt 13 in which the loop coil 16 is embedded passes through the conveyance start position P1, if the loop coil 16 is not disconnected, the induced current is produced at the loop coil 16 by the high-frequency magnetic field oscillating from the magnetic generator 21. On the other hand, if the vertical cracks are formed at the conveyor belt 13 and the loop coil 16 is disconnected, the induced current is not produced at the loop coil 16. Accordingly, the determining unit determines the presence or absence of the induced current or intensity of the induced current at the loop coil 16 based on the induced electromotive force, and thereby the vertical cracks of the conveyor belt 13 are detected.

As described above, according to the conveyor belt 13 and the conveyor belt apparatus 10 according to the present embodiment, the Young's modulus of the cloth-shaped reinforcement 17 in the belt width direction H is higher than that of the main body rubber 14 in the belt width direction H. As such, in comparison with the case in which the cloth-shaped reinforcement 17 is not embedded in the main body rubber 14, a neutral axis against the bending in the belt width direction H at the conveyor belt 13 is moved to the inner side, and the neutral axis and the loop coil 16 can be caused to come near each other in the belt thickness direction T. Accordingly, when the conveyor belt 13 repeats the bending deformation and its restoration in the belt width direction H, an amount of deformation of the loop coil 16 is suppressed, and the weak portion of the loop coil 16 can be inhibited from being broken by stress applied to the loop coil 16. Thereby, the vertical cracks of the conveyor belt 13 can be inhibited from being falsely detected, and detection of vertical cracks can become more accurate.

Further, the Young's modulus of the cloth-shaped reinforcement 17 in the belt width direction H is higher than that of the cloth-shaped reinforcement 17 in the belt longitudinal direction L. As such, as the cloth-shaped reinforcement 17 is embedded in the main body rubber 14, bending rigidity of the conveyor belt 13 in the belt longitudinal direction L can be inhibited from being increased excessively.

For example, as in the present embodiment, when the cloth-shaped reinforcement 17 is constituted of the warp and weft threads, by varying the material or diameter of the warp and weft threads, or varying the number of warp and weft threads per unit length, it is possible to adjust a relationship between the Young's modulus of the cloth-shaped reinforcement 17 in the belt width direction H and the Young's modulus of the cloth-shaped reinforcement 17 in the belt longitudinal direction L.

Further, since the cloth-shaped reinforcement 17 is disposed between the loop coil 16 and the tension member 15 in the main body rubber 14, the cloth-shaped reinforcement 17 is formed of an insulator. Thereby, for example, even when a constitution having electroconductivity like a steel cord is employed as the tension member 15, the loop coil 16 and the tension member 15 can be inhibited from being short-circuited, and the vertical cracks can be detected with higher accuracy.

Further, the loop coil 16 is sandwiched between the cloth-shaped reinforcement 17 and the cloth-shaped body 18 in the belt thickness direction T. As such, when the conveyor belt 13 is manufactured, even if the main body rubber 14 is vulcanized with the loop coil 16 disposed in the main body rubber 14, the cloth-shaped reinforcement 17 and the cloth-shaped body 18 can be interposed between the loop coil 16 and the main body rubber 14. Accordingly, even when the main body rubber 14 has fluidity due to the application of heat and pressure during the vulcanization, the loop coil 16 is inhibited from being deformed and displaced in association with a flow of the main body rubber 14, and the conveyor belt 13 can be formed with high accuracy. Thereby, the vertical cracks can be detected with higher accuracy.

Further, the Young's modulus of the cloth-shaped body 18 in the belt width direction H is lower than that of the cloth-shaped reinforcement 17 in the belt width direction H. As such, as the cloth-shaped body 18 is embedded in the main body rubber 14, the bending rigidity of the conveyor belt 13 in the belt width direction H can be inhibited from being increased excessively.

Further, the vertical crack-detecting means 20 is disposed at the conveyance start position P1. As such, the vertical cracks of the conveyor belt 13 can be detected at the conveyance start position P1. Here, when a conveyance item is dropped from the hopper 30 onto the carrier-side conveyor belt 13, vertical cracks may easily occur in the conveyor belt 13. For this reason, as described above, the vertical cracks of the conveyor belt 13 are detected at the conveyance start position P1. Thereby, the vertical cracks can be effectively detected.

When the vertical crack-detecting means 20 is disposed at the return start position P2, the vertical cracks of the conveyor belt 13 can be detected at the return start position P2. Here, when the conveyance items loaded on the carrier-side conveyor belt 13 are unloaded at the driving pulley 11, vertical cracks easily occur in the conveyor belt 13, for instance, because the conveyance items are shaken on the conveyor belt 13, or because the unloaded conveyance items pile up and come into contact with the conveyor belt 13. Accordingly, as described above, the vertical cracks of the conveyor belt 13 are detected at the return start position P2, and thereby the vertical cracks can be effectively detected.

The technical scope of the present invention is not limited to the above embodiment, and various modifications can be made without departing from the spirit of the present invention.

For example, the loop coil 16 may be triply formed.

Further, in the above embodiment, the loop coil 16 has a rectangular ring shape that is long in the belt width direction H in the aforementioned plan view, but the present invention is not limited thereto. For example, the loop coil may also have a square ring shape in the plan view, a circular ring shape in the plan view, or an oval ring shape in the plan view.

Furthermore, in the above embodiment, the opposite ends of the loop coil 16 in the belt width direction H are disposed at opposite lateral ends of the main body rubber 14 in the belt width direction H, but the present invention is not limited thereto. For example, the loop coil may be disposed only in the middle of the main body rubber 14 in the belt width direction H, and the vertical cracks are likely to occur in the middle of the main body rubber 14.

Further, in the above embodiment, the rubber layers 14a and 14b of the main body rubber 14 are formed of the same rubber material, but the present invention is not limited thereto. For example, the rubber layers of the main body rubber may be formed of different rubber materials. Even in this case, the Young's modulus of the cloth-shaped reinforcement in the belt width direction may be higher than that of the whole rubber layers in the belt width direction, namely that of the main body rubber in the belt width direction.

Furthermore, in the above embodiment, the main body rubber 14 is formed by vulcanizing the unvulcanized rubber layers 14a and 14b that sandwich the loop coil 16, the cloth-shaped reinforcement 17, and the cloth-shaped body 18, but the present invention is not limited thereto. For example, the main body rubber may be formed by previously vulcanizing the rubber layers, disposing the loop coil between the vulcanized rubber layers, and adhering the rubber layers using, for instance, an adhesive.

Further, in the above embodiment, the Young's modulus of the cloth-shaped body 18 in the belt width direction H is lower than that of the cloth-shaped reinforcement 17 in the belt width direction H, but the present invention is not limited thereto. Further, the cloth-shaped body 18 may not be provided.

Also, in the above embodiment, the cloth-shaped reinforcement 17 is disposed between the loop coil 16 and the tension member 15 in the main body rubber 14, but the present invention is not limited thereto. For example, the cloth-shaped reinforcement may be located at the inner side relative to the loop coil.

Furthermore, in the above embodiment, the loop coil 16 is embedded on the inner side at the main body rubber 14, but the present invention is not limited thereto. For example, the loop coil may be embedded on the outer side at the main body rubber.

Further, in the above embodiment, as the tension member 15, the steel cord or the organic fiber cord extending in the belt longitudinal direction L was described. In place of this, canvas formed of, for example, nylon, polyester, or aramid may be employed. Further, in order to prevent the steel cord or the organic fiber cord from being damaged, the canvas may be embedded along with these cords.

Further, in the above embodiment, the carrier-side conveyor belt 13 travels in the state in which it is supported in the trough shape, and the return-side conveyor belt 13 travels in the state in which it is flatly spread in the belt width direction H, but the present invention is not limited thereto.

For example, at least one of the carrier-side conveyor belt 13 and the return-side conveyor belt 13 may travel in a state in which it is bent and deformed in a pipe shape that is rounded around a pipe axis extending in the belt longitudinal direction L.

In addition, the components in the above embodiment can be appropriately substituted with well-known components without departing from the spirit of the present invention. Further, the aforementioned modifications may be suitably combined.

Industrial Applicability

In the conveyor belt, vertical cracks can be detected with high accuracy.

DESCRIPTION OF REFERENCE SIGNS

10: conveyor belt apparatus
13: conveyor belt
14: main body rubber
15: tension member
16: loop coil
17: cloth-shaped reinforcement
18: cloth-shaped body
21: magnetic generator
22: detector

The invention claimed is:

1. A conveyor belt comprising:
a main body rubber configured to extend in a belt longitudinal direction;
tension members embedded in the main body rubber throughout a circumference of the main body rubber in the belt longitudinal direction; and
loop coils embedded in the main body rubber and configured to have an annular shape in plan view taken in a belt thickness direction,
wherein the loop coils are embedded at one side of the main body rubber in the belt thickness direction,
the tension members are embedded at the other side of the main body rubber in the belt thickness direction relative to the loop coils,
the loop coils are disposed above a cloth-shaped reinforcement embedded in the main body rubber, and
a Young's modulus of the cloth-shaped reinforcement in a belt width direction is higher than that of the main body rubber in the belt width direction, and is higher than that of the cloth-shaped reinforcement in the belt longitudinal direction.

2. The conveyor belt according to claim 1, wherein the cloth-shaped reinforcement is disposed between the loop coil and the tension member in the main body rubber.

3. The conveyor belt according to claim 1, wherein the loop coil is sandwiched in the belt thickness direction between the cloth-shaped reinforcement and a cloth-shaped body embedded in the main body rubber.

4. The conveyor belt according to claim 3, wherein the cloth-shaped body has a lower Young's modulus in the belt width direction than the cloth-shaped reinforcement.

5. A conveyor belt apparatus comprising:
the conveyor belt according to claim 1;
a magnetic generator configured to generate a magnetic field that produces an induced current at each loop coil; and
a detector configured to detect the induced current produced at each loop coil.

* * * * *